(12) United States Patent
Chen

(10) Patent No.: US 7,367,690 B2
(45) Date of Patent: May 6, 2008

(54) LAMP DEVICE WITH ROTATABLE LEGS

(76) Inventor: Meiric Chen, 235 Chung-Ho Box 8-24, Taipei (TW)

( * ) Notice: Subject to any disclaimer, the term of this patent is extended or adjusted under 35 U.S.C. 154(b) by 49 days.

(21) Appl. No.: 11/406,127

(22) Filed: Apr. 19, 2006

(65) Prior Publication Data
US 2007/0248353 A1 Oct. 25, 2007

(51) Int. Cl.
*F21V 19/02* (2006.01)
(52) U.S. Cl. ............ 362/285; 362/287; 362/419
(58) Field of Classification Search ........ 362/285, 362/287, 418–419, 427, 425, 431, 282, 351, 362/410, 413, 433
See application file for complete search history.

(56) References Cited

U.S. PATENT DOCUMENTS 3,116,023 A * 12/1963 Dusen, Jr. et al. ......... 362/294
5,176,443 A * 1/1993 Lin ......................... 362/413
5,825,637 A * 10/1998 Chen ....................... 362/417
2005/0024882 A1* 2/2005 Sherman ................... 362/419
2005/0078482 A1* 4/2005 Bartlett .................... 362/285

* cited by examiner

*Primary Examiner*—Jong-Suk (James) Lee
*Assistant Examiner*—Julie A. Shallenberger

(57) ABSTRACT

A lamp device with two rotary arms comprises a lamp seat having a stand tube installed on the base; a lampshade having various forms; two opposite sides of the lampshade being formed with through holes; a rotary arm unit combined to the lamp seat at one end thereof and a lampshade at another end thereof; the rotary arm unit including a first rotary arm and a second rotary arm; the first rotary arm rotatably combined to one end of the stand tube through a first rotation unit; another end of the first rotary arm being installed with a first locking portion; two ends of the second rotary arm being rotatably installed to one end of the first rotary arm through a second rotation unit; another end of the second rotary arm being installed with a second locking portion; and a light emit unit provided on the rotary arm unit.

6 Claims, 8 Drawing Sheets

LAMP DEVICE WITH ROTATABLE LEGS

FIELD OF THE INVENTION

The present invention relates to lamp devices, and particularly to a lamp device with rotatable legs, wherein the structure of the lamp device is simple and the lamp device can be detached and assembled easily and conveniently so as to improve the defect in the prior art.

BACKGROUND OF THE INVENTION

The current lamp devices, such as stand lamps or table lamps, have lampshades. The lampshades are combined to and exposed out of the lamp seat and the light emitting device. Due to the electrostatic, light and heat effects, dust and insects will accumulate on the inner side or outer side of the lamp seat so as to effect the emitting light. If a layer of oxide is electroplated upon the surfaces of the lampshade, the accumulated dust and insects will reduce. However a small amount dust still accumulate thereon. Thus, it is necessary to detach all the elements of the lamp device for cleaning, but in prior art, the elements are firmly secured. Thus the detaching work is tedious and time consumed. Furthermore, after cleaning, the lamp elements must be reassembled. Thus the whole work is time and labor consumed.

Therefore, there is an eager demand for a novel design which can improve the above mentioned defect.

SUMMARY OF THE INVENTION

The object of the present invention is to provide a lamp device with rotatable legs, wherein the structure of the lamp device is simple and the lamp device can be detached and assembled easily and conveniently so as to improve the defect in the prior art.

To achieve above object, the present invention provides a lamp device with two rotary arms which comprises a lamp seat having a base and a stand tube installed on tile base; a lampshade having various forms; two opposite sides of the lampshade being formed with through holes; a rotary arm unit combined to the lamp seat at one end thereof and lampshade at another end thereof; the rotary arm unit including a first rotary arm and a second rotary arm; the first rotary arm rotatably combined to one end of the stand tube through a first rotation unit; another end of the first rotary arm being installed with a first locking portion; the locking portion being locked to one of the two through holes of the lampshade through a locking unit; one end of the second rotary arm being rotatably installed to one end of the first rotary arm through a second rotation unit; another end of the second rotary arm being installed with a second locking portion which is further installed to another through hole of the lampshade through a locking unit; and a light emitting unit provided on the rotary arm unit; the light emitting unit having a light emitting element which is combined to the bulb seat.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 4, the structure of the present invention is illustrated.

A lamp seat 1 has a base 11 and a stand tube 12 installed on the base 11.

Figure 1:
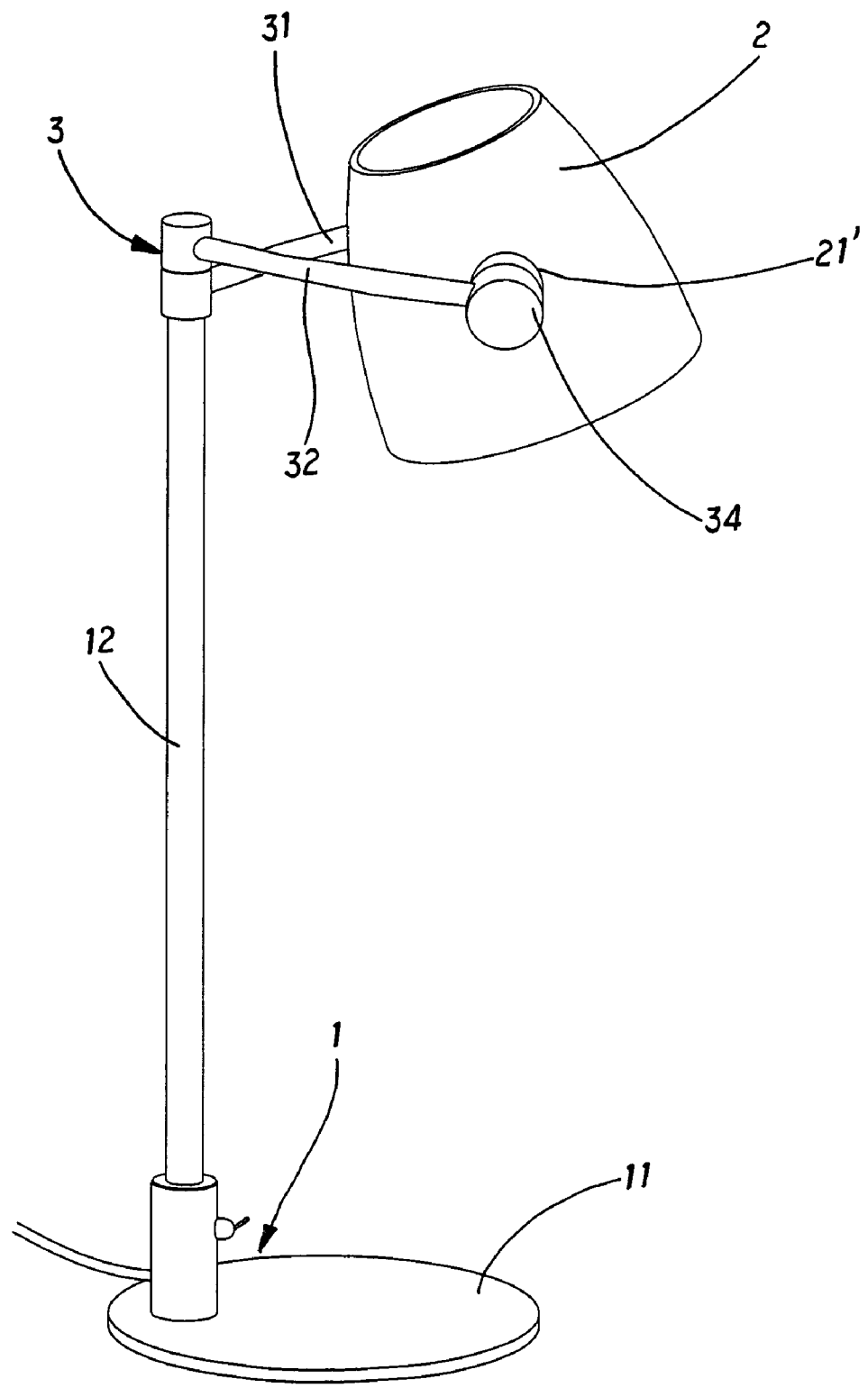
FIG. 1 is an assembled perspective view of the present invention.
Figure 2:
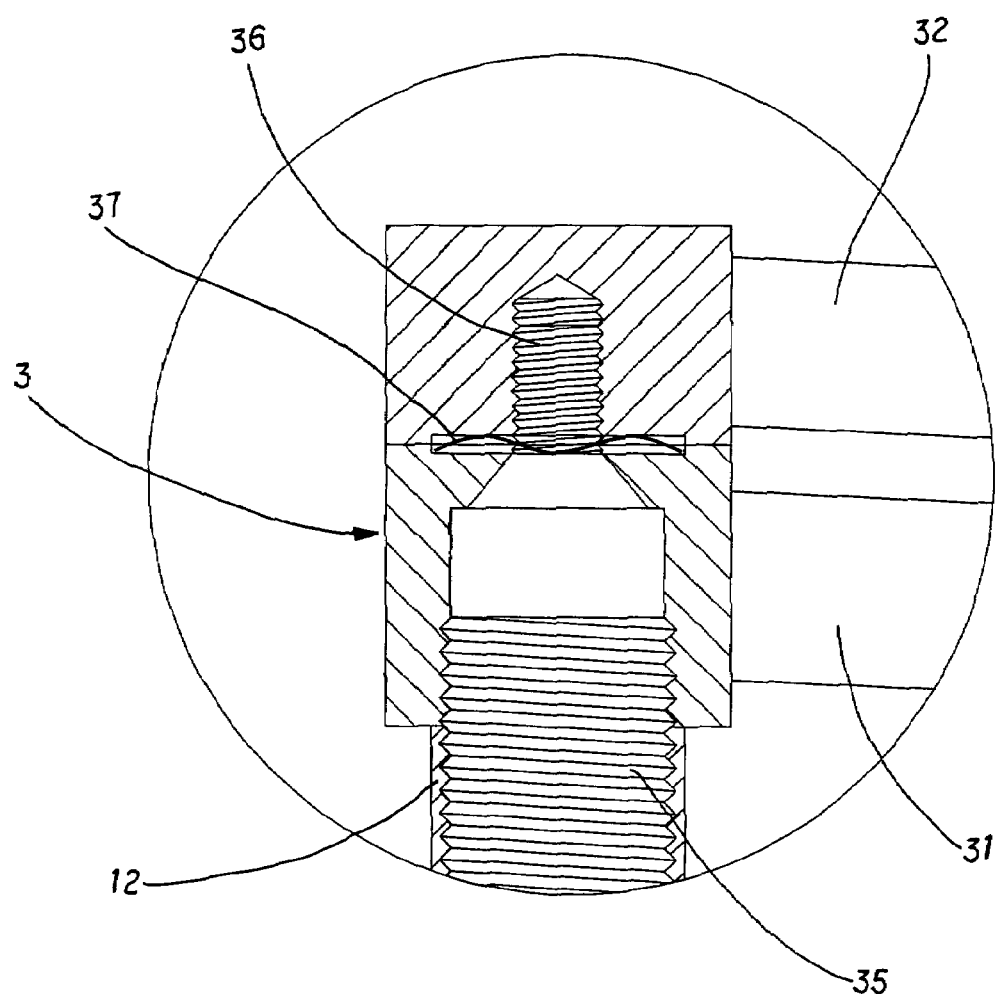
FIG. 2 is a structural cross sectional view showing a part of the present invention.
Figure 3:
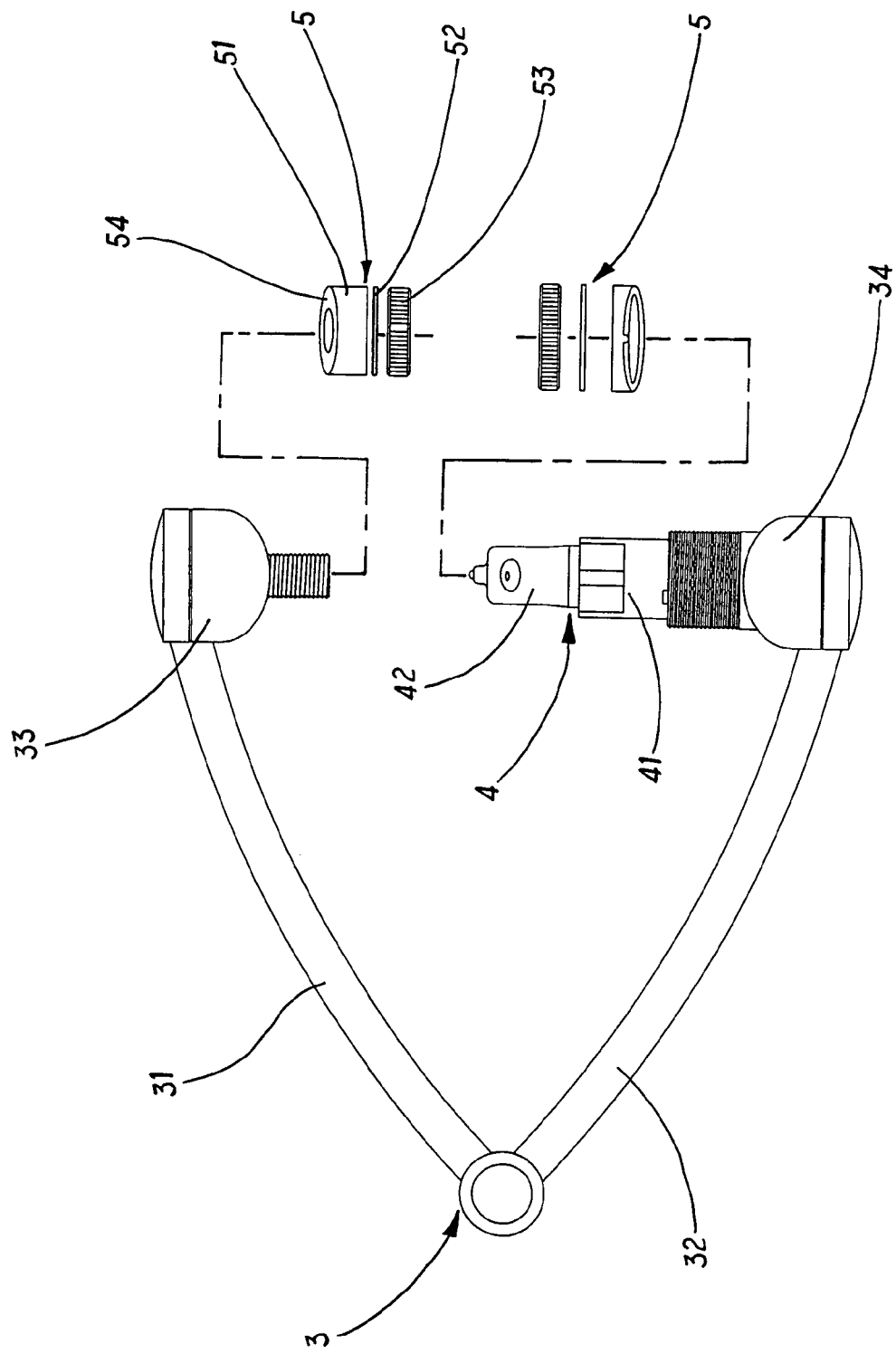
FIG. 3 is an assembled schematic view about the rotary arm unit of the present invention.
Figure 4:
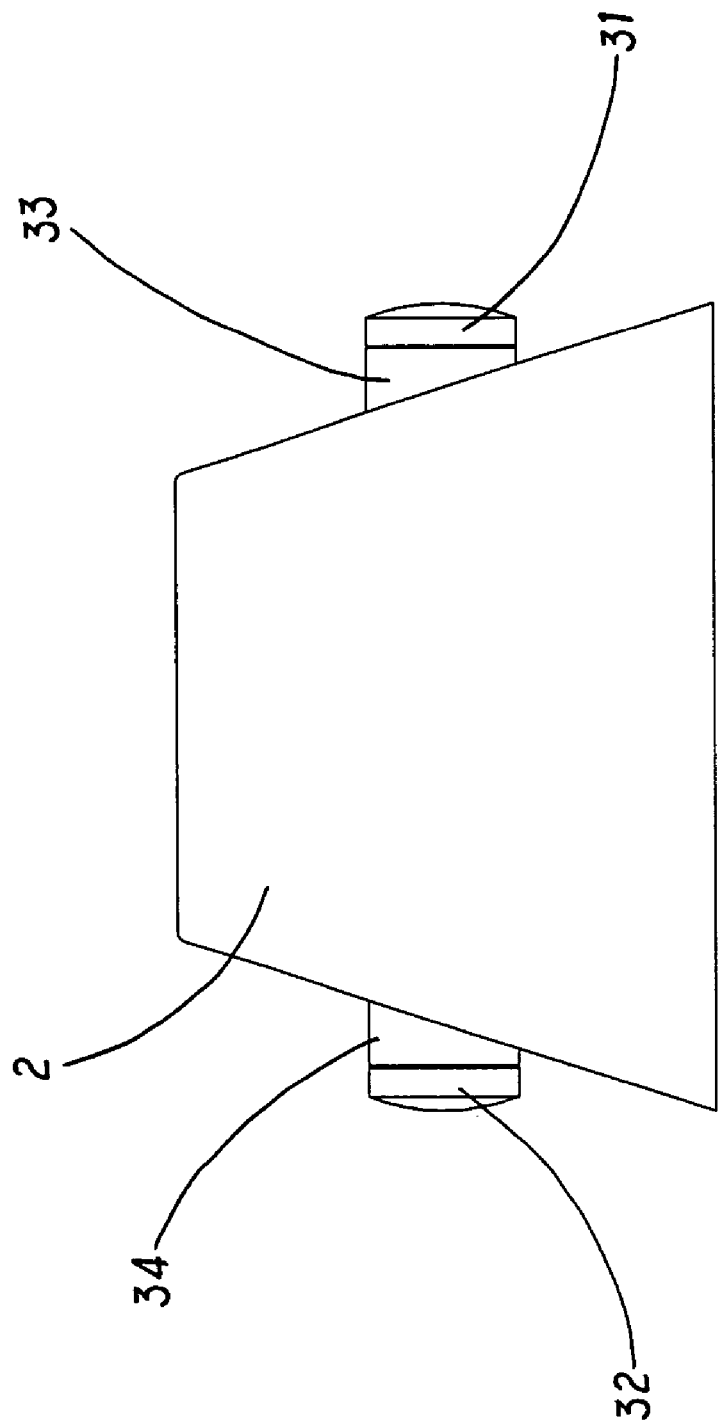
FIG. 4 is a schematic view about the lampshade of the present invention.

A lampshade 2 has various forms, such as a truncated conic lampshade with a cambered lateral side (referring to FIG. 1) or a straight lateral side (referring to FIG. 4). Two opposite sides of the lampshade 2 are formed with through holes 21, 21'.

A rotary arm unit 3 is combined to the lamp seat 1 at one end thereof and combined to the lampshade 2 at another end thereof. The rotary arm unit 3 includes a first rotary arm 31 and a second rotary arm 32. The first rotary arm 31 is rotatably combined to one end of the stand tube 12 through a first rotation unit 35. Another end of the first rotary arm 31 is installed with a first locking portion 33. Preferably, the first locking portion 33 is a threaded rod. Thereby the locking portion 33 is locked to one of the two through holes 21 of the lampshade 2 through a locking unit 5. One end of the second rotary arm 32 is rotatably installed to one end of the first rotary arm 31 through a second rotation unit 36 and a wave like washer 37 so as to be assembled to one end of a stand tube 12. Another end of the second rotary arm 32 is installed with a locking portion 34, preferably the second locking portion is a threaded rod so as to be installed to another through hole 12' of the lampshade 2 through a locking unit 5.

The stand tube 12 is a single straight tube which approximately vertically stands from the lamp seat 1. The first rotation unit 35 of the first rotary arm 31 is threaded to the stand tube 12 and is approximately perpendicular to the stand tube 12; and the second rotation unit 36 of the first rotary arm 32 is threaded to a thread protruded from an upper side of the first rotation unit 35 and the second rotation unit 36 is approximately perpendicular to the stand tube 12.

A light emitting unit 4 is provided on the rotary arm unit 3. The light emitting unit 4 has a bulb seat 41. The light emitting unit 4 is secured to the first locking portion 33 or the first rotary arm 31 or the second locking portion 34 of the second rotary arm 32. In this embodiment, the light emitting unit 4 is installed to the locking portion 34 of the second rotary arm 32. The light emitting emit unit 4 has a light emitting element 42, such as a bulb, which is combined to the bulb seat 41.

Each locking unit 5 includes a locking ring 51, a washer 52 and a locking element 53. The locking ring 51 has a non-plane end surface 54 which is corresponding to a surface of the lampshade 2 so that the locking ring 51 can be attached upon the lampshade 2.

Figure 5:
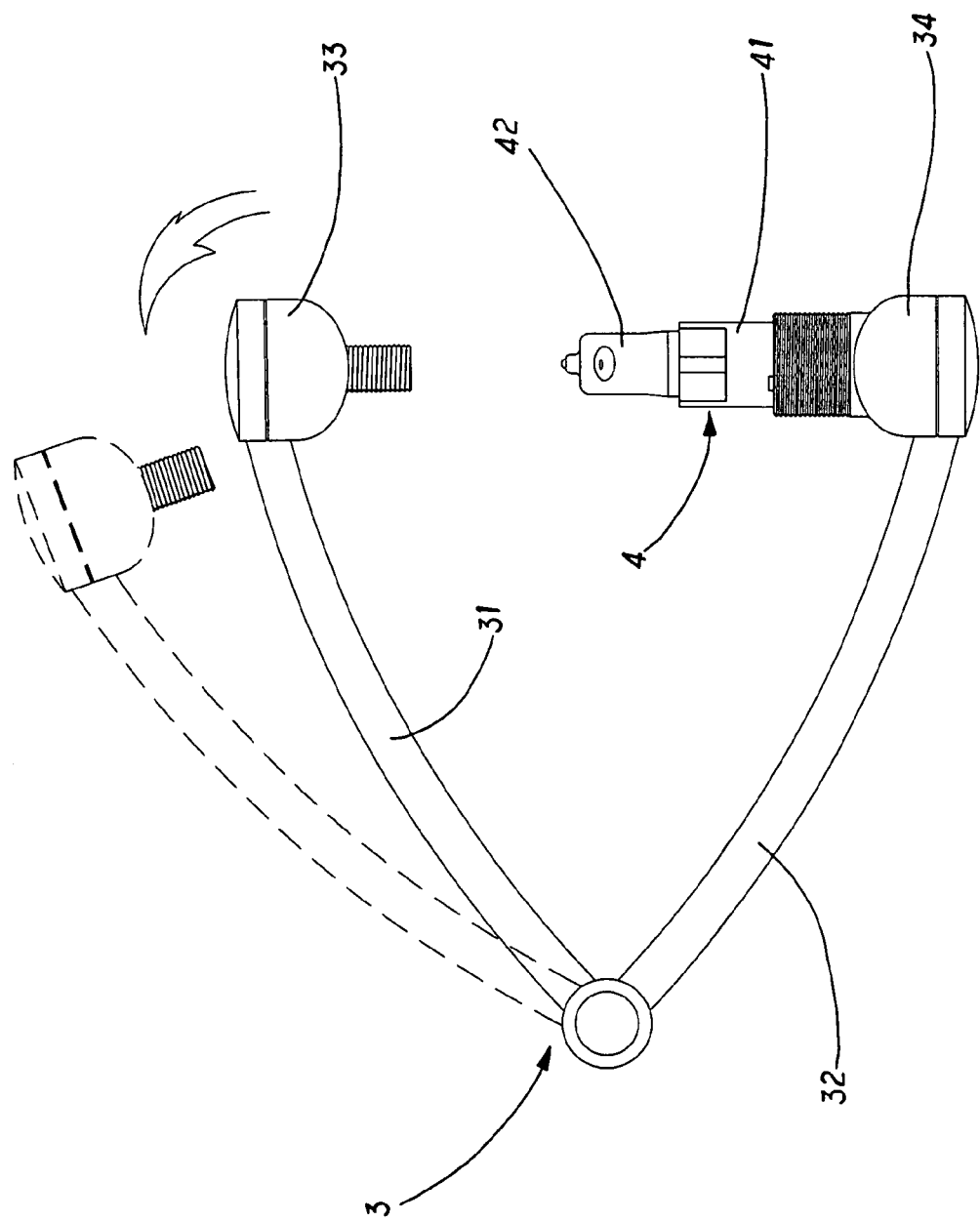
FIG. 5 is a schematic view about the assembly of the rotary arm unit and the lampshade of the present invention.
Figure 6:
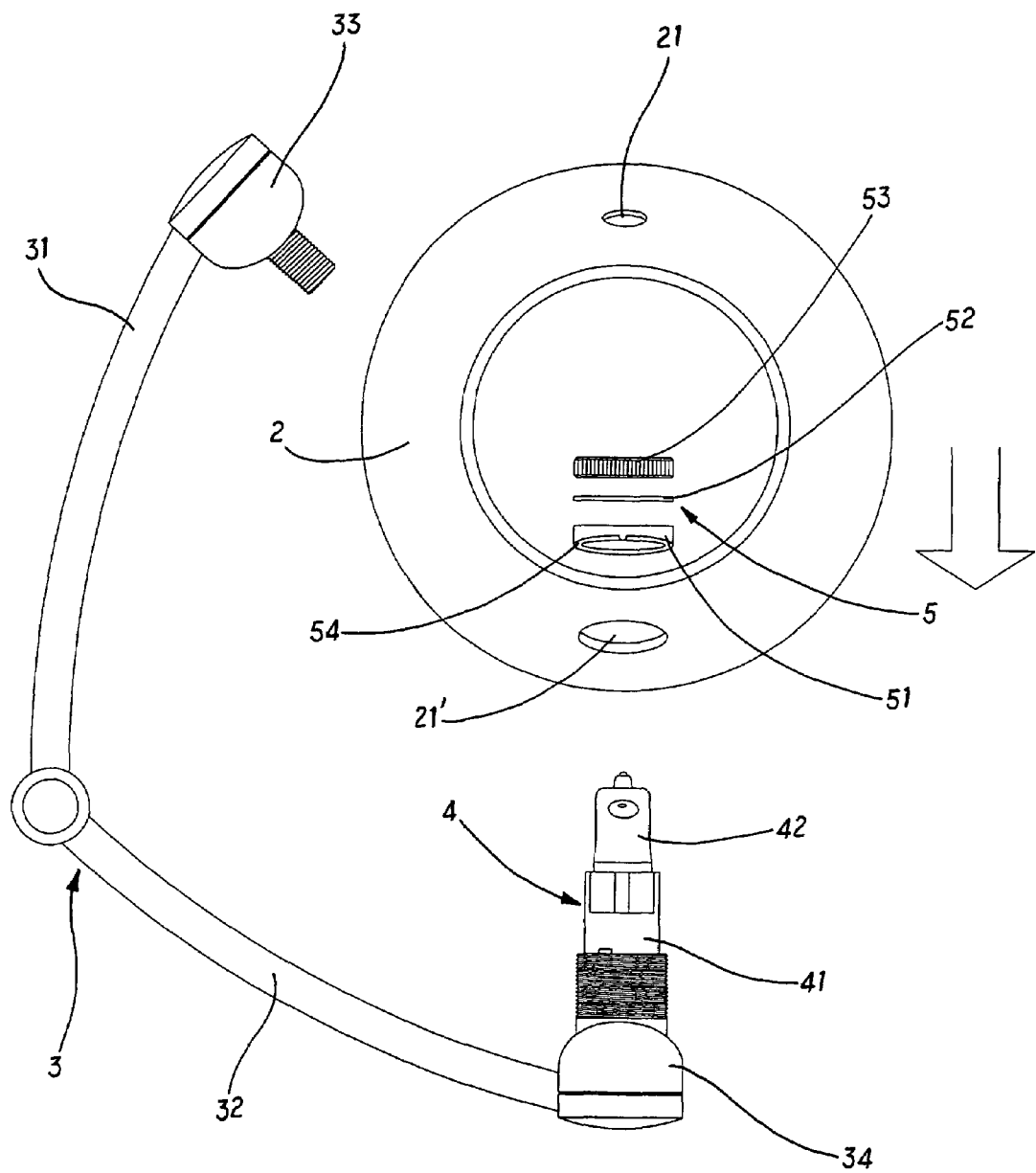
FIG. 6 is another schematic view showing the assembly of the rotary arm unit and the lampshade according to the present invention.
Figure 7:
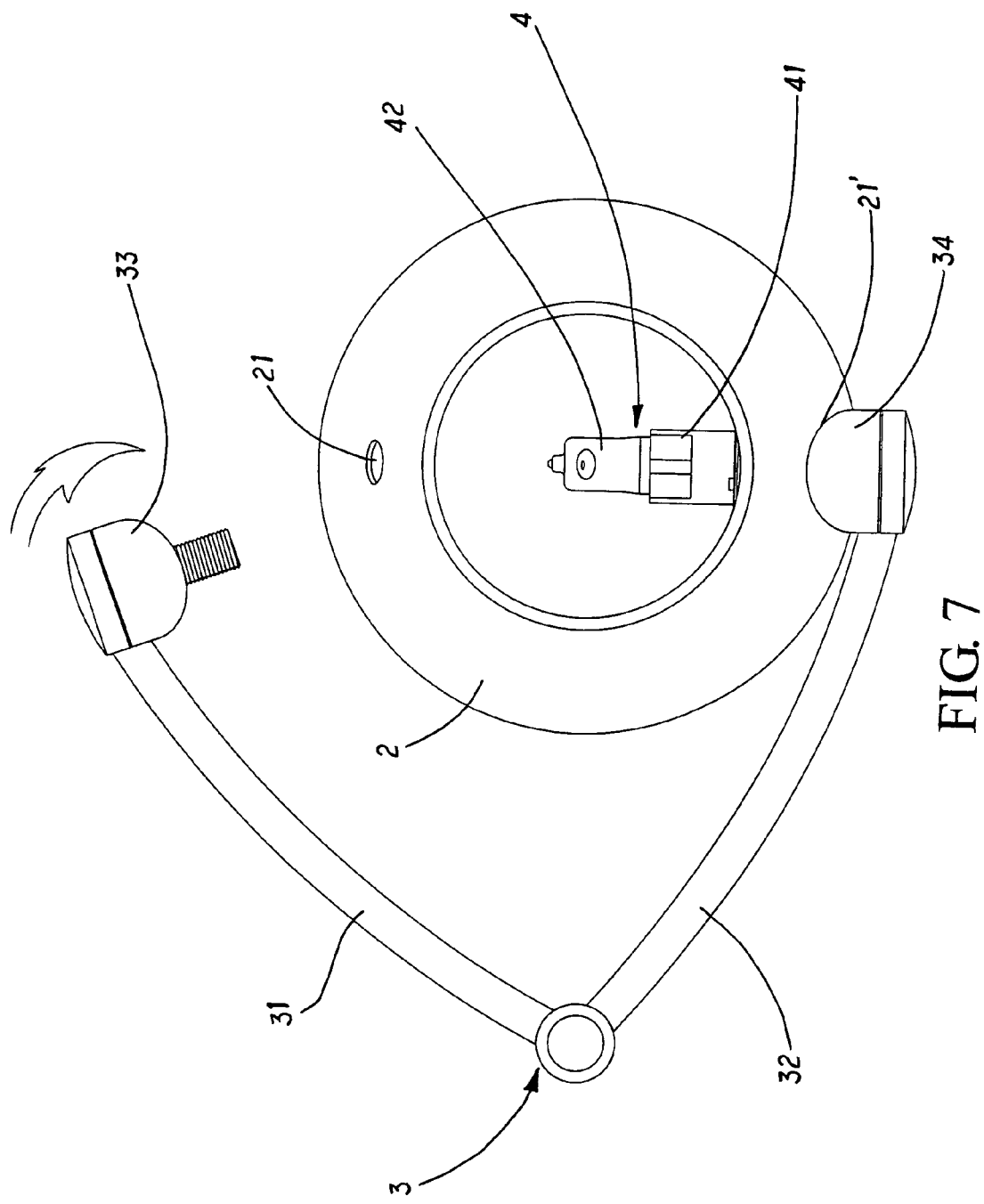
FIG. 7 is a further schematic view showing the assembly of the rotary arm unit and the lampshade according to the present invention.
Figure 8:
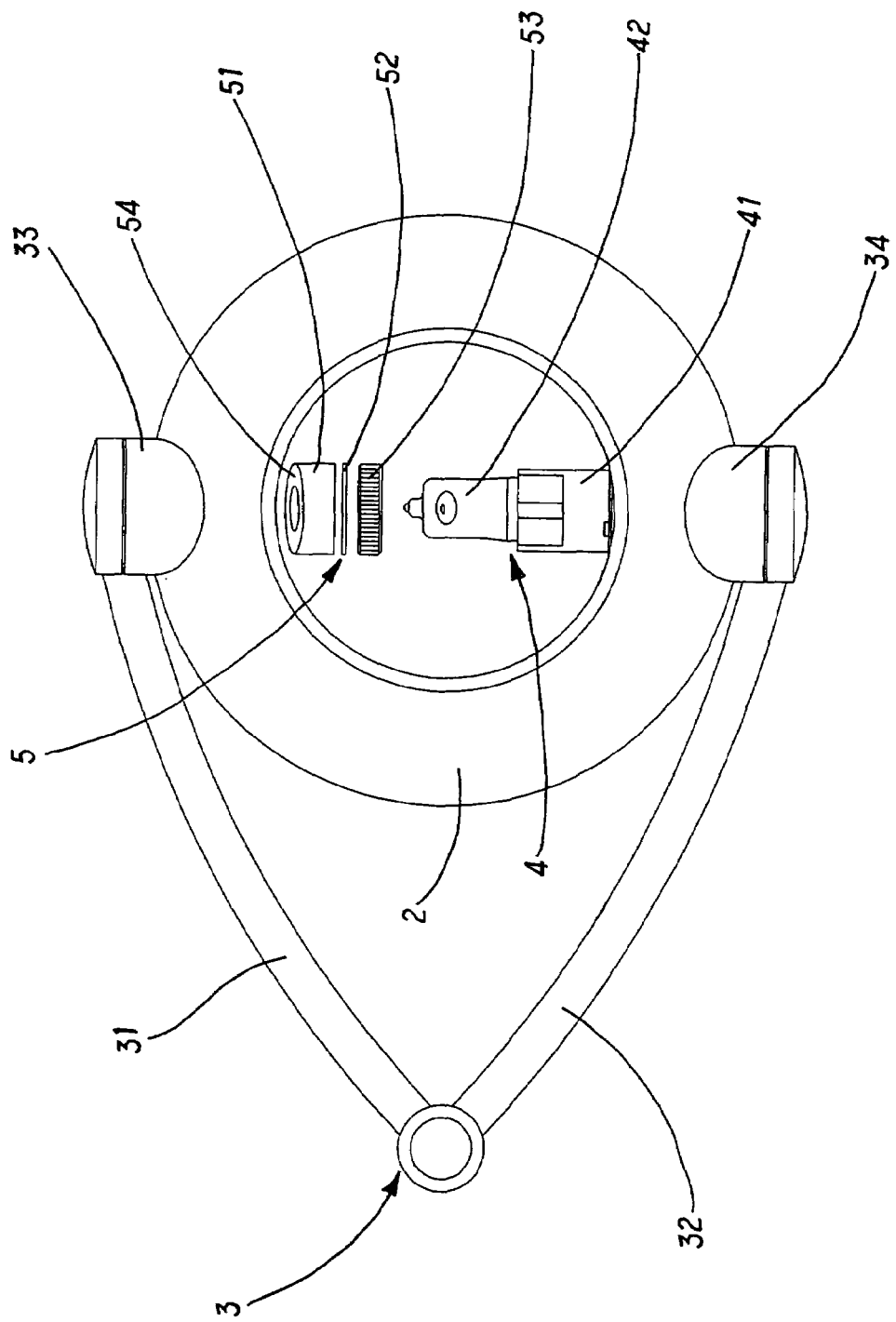
FIG. 8 is a yet schematic view showing the assembly of the rotary arm unit and the lampshade according to the present invention.

Referring to FIGS. 5 to 8, the assembly of the present invention is illustrated. Firstly, the second rotary arm 32 is overlapped to the first rotary arm 31. Then the first rotary arm 31 and second rotary arm 32 are arranged at two sides of the lampshade 2, as shown in FIG. 5. Then the two sides of the lampshade 2 are arranged to align the first locking portion 33 and the second locking portion 34 of the first rotary arm 31 and the supporting frame 33, respectively. Then the locking units 5 serves to lock the first locking portion 33 and the second locking portion 34 to the lampshade 2, as shown in FIG. 6. Then the first rotary arm 31 is rotated reversely so that the first locking portion 33 is engaged to the through hole 21, as shown in FIG. 7. Then the second locking portion 34 is locked to the through hole 21', as shown in FIG. 8. Thereby the assembly of the present invention is complete.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A lamp device with two rotary arms comprising:
a lamp seat having a base and a stand tube installed on the base;
a lampshade having various forms; two opposite sides of the lampshade being formed with through holes;
a rotary arm unit combined to the lamp seat at one end thereof and the lampshade at another end thereof; the rotary arm unit including a first rotary arm and a second rotary arm; one end of the first rotary arm rotatably combined to one end of the stand tube through a first rotation unit; another end of the first rotary arm being installed with a first locking portion; the first locking portion being locked to one of the two through holes of the lampshade through a locking unit; one end of the second rotary arm being rotatably installed to one end of the first rotary arm through a second rotation unit; another end of the second rotary arm being installed with a second locking portion which is further installed to another through hole the lampshade through one of two locking units a lock; and
a light emitting unit provided on the rotary arm unit; the light emitting unit having a light emitting element which is combined to the bulb seat; and
wherein the stand tube is a single straight tube which approximately vertically stands from the lamp seat;
the first rotation unit of the first rotary arm is threaded to the stand tube and is approximately perpendicular to the stand tube; and the second rotation unit of the first rotary arm is threaded to a thread protruded from an upper side of the first rotation unit and the second rotation unit is approximately perpendicular to the stand tube.

2. The lamp device with rotatable legs as claimed in claim 1, wherein each locking unit includes a locking ring, a washer and a locking element so as to lock the first rotary arm or the second rotary arm to the lamp seat.

3. The lamp device with rotatable legs as claimed in claim 1, wherein the locking ring has a non-plane end surface which is corresponding to a surface of the lampshade so that the locking ring can be attached upon the lampshade.

4. The lamp device with rotatable legs as claimed in claim 1, wherein the light emitting unit is secured to the first locking portion of the first rotary arm or the second locking portion of the second rotary arm.

5. The lamp device with rotatable legs as claimed in claim 1, wherein the lampshade has a truncated conic lampshade with a cambered lateral side.

6. The lamp device with rotatable legs as claimed in claim 1, wherein the lampshade has a truncated conic lampshade with a straight lateral side.

* * * * *